Patented Dec. 26, 1950

2,535,042

UNITED STATES PATENT OFFICE 2,535,042

PREPARATION OF IRON CARBIDES

Ernst M. Cohn and Lawrence J. E. Hofer, Pittsburgh, Pa., assignors to the United States of America as represented by the Secretary of the Interior No Drawing. Application January 5, 1950, Serial No. 137,042

11 Claims. (Cl. 23—208)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to the preparation of iron carbides, and is particularly concerned with the preparation of the iron carbide known as cementite and in the preparation of catalytic materials composed of or containing cementite.

The iron carbide cementite is an interstitial compound of iron having the molecular formula $Fe_3C$, a Curie point of 205° C. to 220° C., and a specific magnetization at magnetic saturation and at room temperature of 135 to 139 c. g. s. units per gram. Cementite may also be identified by its crystal structure which comprises an orthorhombic cell unit with lattice parameters $a=4.517$ kX units, $b=5.079$ kX units, $c=6.730$ kX units. Cementite is also characterized by its X-ray diffraction data which are given by Hofer, Cohn, and Peebles in an article appearing in the Journal of the American Chemical Society, vol. 71, pp. 191 and 192 (1949).

A number of methods for the preparation of cementite have been previously suggested. These prior methods often involve lengthy and tedious procedures and the cementite produced has properties which renders it unsuited for some uses, particularly for use as a catalyst in heterogeneous reactions such as the so-called Fischer-Tropsch reaction. Most of these prior processes result in cementite contaminated with free or elemental carbon. (Free or elemental carbon is defined as non-carbidic carbon in which carbon to carbon bonds have been established.) Most of these prior methods likewise operate at high temperatures which effect fusion and sintering of the cementite. This sintering and fusion results in a dense mass having a small effective surface area. Such a mass is unsuited for use as a catalyst in heterogeneous reactions, since in heterogeneous catalysis, a catalytic mass having the largest possible surface area is necessary if the catalyst is to be highly active. It has been proposed, for example, that cementite be prepared by dissolving carbon in liquid iron, which is subsequently quenched, annealed, and then decomposed chemically so as to separate metallic iron from cementite (Schenck and Stenkhoff, Z. anorg. allg. Chem. 161, 287–303, 1927). This method is wasteful and tedious, and results in a dense, fused mass contaminated with free carbon. Another proposed method, subject to similar disadvantages, is the thermal decomposition of complex iron cyanides and the subsequent purification of cementite obtained therefrom (Mittasch and Kuss, Z. Elektrochem. 34, 159–170, 1928). Carburization of iron with liquid sodium cyanide, as proposed by Pingault (Ann. Chim. 20, 371–438, 1933), yields cementite of good purity, but the reaction must be carried out for long periods at high temperatures, and sintering and fusion of the cementite produced is unavoidable. Cementite may also be prepared by the direct carburization of iron with carbon monoxide, but at the temperatures required for this reaction to proceed quantitatively, the resulting cementite will be contaminated by free carbon.

It is an object of the invention to provide a process for the preparation of cementite which is free from the disadvantages of prior methods. More particularly, it is an object of the invention to provide an improved process for the preparation of cementite which process is conducted at relatively low temperatures and results in cementite which is substantially uncontaminated by free carbon. It is a further object of the invention to provide a process for the preparation of cementite which, by virtue of its low temperature of operation, produces non-fused, non-sintered cementite.

It is a further object of the invention to provide a process for the preparation of a catalytic material containing cementite which has a large surface area and which is substantially uncontaminated with free carbon, and it is a particular object of the invention to provide a process for the preparation of a heterogeneous catalyst containing cementite which is especially useful in the catalytic hydrogenation of carbon monoxide.

It is still a further object of the invention to provide a process which results in the production of pure cementite or, if desired, cementite in admixture with other iron carbides and/or with free iron, uncontaminated in each case by the presence of free carbon.

These and other objects are accomplished, in accordance with the process of the invention, by carburizing iron at a temperature below that at which the formation of appreciable amounts of free carbon occurs, discontinuing this low temperature carburization before the atom ratio of carbon to iron reaches 1:2, and then annealing this carburized iron at a temperature sufficiently high to convert at least a portion of the iron carbides present in the carburized iron to cementite, but keeping the temperature during the anneal below the decomposition range of cementite and below the sintering range of the mass being treated.

In more particular the process of the invention for the preparation of cementite involves the steps of carburizing iron by the action of a carboniferous gas at a temperature of from 100 to 350° C., preferably 150 to 275° C., discontinuing the carburization before the carbon to iron ratio reaches 1:2, and preferably before the carbon to iron ratio exceeds 1:3, and then annealing the carburized iron at a temperature of from 250 to 700° C., preferably from 400 to 550° C., in order to convert some, or all, of the iron carbides present in the carburized iron to cementite. Where it is desired to produce a material having properties which suit it for use as a heterogeneous catalyst, the above process is conducted on an iron mass having a large initial surface area.

While the invention is not to be limited to any particular theory, it is believed that cementite is produced, in accordance with the process of the invention, according to the following mechanism. In the initial low temperature carburization step, iron carbides are formed having the approximate molecular formula $Fe_2C$ consisting of the so-called Hägg carbide and/or a close packed hexagonal carbide (see Hofer et al., J. Amer. Chem. Soc., 71, pp. 189–195, 1949). The formation of these carbides proceeds at good rates in the presence of carboniferous gases at temperatures at which substantially no free carbon is formed. This low temperature carburization is discontinued before all the iron present has been converted to $Fe_2C$ or, in other words, carburization is discontinued before the atom ratio of carbon to iron reaches 1:2. At this point there will be a mixture of $Fe_2C$ and free iron.

During the anneal, or heat treatment step, which is preferably conducted in an inert atmosphere or in vacuum, free iron and the iron carbide corresponding to the formula $Fe_2C$ will react according to the following equation:

$$Fe_2C + Fe \rightarrow Fe_3C$$

This reaction begins at relatively low temperatures (in the vicinity of 300° C.), and is completed at temperatures below that at which the cementite formed will decompose, and below that at which sintering of the cementite begins. The cementite produced in this manner is uncontaminated by the presence of elemental carbon and, by virtue of the low temperatures employed, without sintering or fusion.

If, on the other hand, the initial carburization is allowed to proceed to the point where the iron is carburized completely to $Fe_2C$ (an atom ratio of 1:2), during the anneal the following reaction will occur:

$$3Fe_2C \rightarrow 2Fe_3C + C$$

This reaction, although yielding cementite, requires higher temperatures and longer periods of heating during the anneal and produces a product which is contaminated by free carbon.

Any suitable carburizing agent which will carburize iron at low temperatures without formation of free carbon may be used. However, it is preferred to use a carboniferous gas or vapor which is suitable for low temperature carburization. Preferred carboniferous gases for this step include carbon monoxide and hydrocarbons which are gaseous at the carburization temperature used, such as methane, ethane, propane, butane, etc. Other carboniferous gases may be used although the use of compounds which contain groups which give rise to undesired side reactions should be avoided.

The carburizing temperature should be held within the limits of 100° C. to 350° C. At temperatures below 100° C. carburization does not proceed at an appreciable rate and the use of such temperatures is uneconomical. At temperatures above 350° C. the formation of substantial amounts of free carbon is inevitable. The rate of carburization increases with higher temperatures and it is therefore desirable, for economic reasons, to employ as high a temperature as possible and yet avoid the deposition of free carbon. At temperatures above about 250° C. the tendency for the formation of free carbon increases and when carburizing at 250° C. to 350° C., it is advisable to keep the products at these temperatures for only short periods of time. The carburization process may be carried out at temperatures as high as 350° C. for short periods of time without appreciable deposition of free carbon, but if this temperature is maintained over a long period, substantial formation of free carbon will occur. Since the rate of carburization decreases as the carburization becomes more complete, it will often be advisable to conduct the carburization in two or more stages, e. g., the first stage at a lower temperature over a comparatively long period of time and the second stage at a higher temperature for a comparatively short period of time. When the first stage is conducted at a relatively low temperature, for example, 200° C., the carburization will proceed quite rapidly to a certain point and then slow down. By raising the temperature for a short time, for example, to 275° C., the carburization can be quickly completed to the desired point without danger of deposition of free carbon. Preferably, the carburization will be conducted in the range of from about 150° C. to 275° C., in which range the rate of carburization is fairly rapid, while the danger of deposition of free carbon is small.

The time required for the carburization step will depend, inter alia, upon the degree of carburization desired, the temperature employed, the type of impurities present in the iron to be carburized, and particularly upon the state of subdivision of the iron. The iron to be carburized may exist in any desired state of subdivision. However, this invention is primarily adapted for the preparation of bulk carbides and unless it is merely desired to form a surface carbide, the iron is preferably finely divided or otherwise disposed so as to present a large surface area. In order to form a true bulk carbide, that is, a homogeneous mass in which the internal, as well as the surface iron is converted to carbide, it is necessary to start with an iron mass having the greatest possible surface area if bulk carbiding is to be achieved within a reasonable time. The degree of carburization may be determined from time to time or continuously during the carburization by noting the weight gain of the iron, or by X-ray diffraction analysis or by thermomagnetic analysis.

In order to avoid the formation of free carbon during the anneal or heat treatment step, it is necessary to discontinue the carburization before the iron is fully carburized to $Fe_2C$ (that is before the atom ratio of carbon to iron reaches 1:2). Some free iron must remain in order for the reaction described above, Fe+Fe₂C→Fe₃C to proceed. Preferably, the carburization is discontinued before the atom ratio of carbon to iron exceeds 1:3 (at which ratio the partially carburized iron contains an equi-molecular mixture of Fe₂C and Fe). By discontinuing the carburization when the atom ratio of carbon to iron is exactly 1:3 (which may be determined for instance by the weight gain of the iron being carburized) and then completely annealing this partially carburized iron, pure cementite may be obtained uncontaminated by free carbon, free iron, or other iron carbides. Where the carburization is discontinued before the atom ratio of carbon to iron reaches 1:3, complete annealing will result in a mixture of Fe₃C and free iron.

If the carburization is continued until the atom ratio of carbon to iron exceeds 1:3 but does not reach 1:2, the partially carburized iron will contain a mixture of Fe₂C and Fe with a greater molecular amount of Fe₂C than Fe. During the anneal the reaction: Fe₂C+Fe→Fe₃C will proceed until the free iron is substantially exhausted and then, if the anneal is continued, the remaining Fe₂C will decompose according to the equation:

$$3Fe_2C \rightarrow 2Fe_3C + C$$

By conducting the anneal at comparatively low temperature and by discontinuing the anneal after the first reaction is substantially complete, the second reaction will not take place and the final product will contain a mixture of Fe₃C (cementite) and Fe₂C with no free carbon. In general, however, the more completely the initial carburization is carried out, that is, the closer the atom ratio of carbon to iron is allowed to approach 1:2, the more difficult it is to obtain a cementite-containing mass which is uncontaminated by free carbon.

From the above discussion, it can be seen that by properly controlling the degree of carburization and the period of the anneal, it is possible to produce pure cementite, or instead, mixtures of cementite with free iron, or mixtures of cementite with Fe₂C, or, if desired, a mixture of cementite, free iron and Fe₂C, all of these products being uncontaminated by free carbon.

During the anneal, the temperature should be kept within the range of 250° C. to 700° C. At temperatures below 250° C. the reaction Fe+Fe₂C→Fe₃C does not proceed at a measurable rate while at temperatures above 700° C. the rate of formation of free carbon is quite rapid. Furthermore, at temperatures above 700° C., iron and its carbides begin to sinter after exposure to these temperatures for even short periods of time. In the range of from 550° C. to 700° C., it is advisable to conduct the anneal for only short periods of time since the formation of free carbon and the tendency to sinter increases quite rapidly as the temperature increases above 550° C. It is preferable to operate in the range of from about 400° C. to 550° C. since in this range the reaction Fe₂C+Fe→Fe₃C proceeds relatively fast and with little tendency towards formation of free carbon or sintering. When annealing in the lower temperature range, for example, below 500° C., there is little tendency toward formation of free carbon even though the carburization has been carried beyond an atom ratio of carbon to iron of 1:3. This is probably due to the fact that, at lower temperatures, the reaction 3Fe₂C→2Fe₃C+C proceeds very slowly. The time required for the anneal at a given temperature will vary inter alia, in accordance with the type of additives present in the iron and in accordance with the degree of carburization. As previously pointed out, the anneal may be carried to completion, that is, continued until all the iron carbides present (as Fe₂C) in the carburized iron are converted to cementite. If desired, however, the anneal may be discontinued when only a portion of the Fe₂C is converted to cementite. During the anneal, the course of the transformation of Fe₂C to Fe₃C in accordance with the equation $$Fe_2C + Fe \rightarrow Fe_3C$$

may be followed by means of a magnetic balance. When annealing at 400° C., for example, the disappearance of free iron as a result of the above reaction, may be noted by the disappearance of ferromagnetism in the sample being annealed. In the range of the preferred annealing temperatures (i. e. 400° C. to 550° C.), the only ferromagnetic component is metallic iron, these temperatures being above the Curie points of Fe₂C and Fe₃C.

In the production of a cementite-containing material which is intended for use as a heterogeneous catalyst, it is desirable to start with iron in a very finely divided or highly porous state such that the iron possesses the large surface area which is essential for high catalytic activity. A large surface area in the iron to be carburized may be produced by any method commonly known. Thus, iron may be obtained in a finely divided condition from skeletal catalysts, by thermal decomposition of iron carbonyl, or a highly porous iron mass may be produced, for example, by low temperature reduction of a precipitated, cemented, sintered, or fused iron oxide. The precipitated, cemented, sintered, or fused iron oxide is rendered porous by removal of the oxygen by reduction in a stream of hydrogen, for example, at a temperature of from 400° C. to 500° C. such that no sintering of the reduced iron occurs, and the mass, after reduction, is left with a very large surface area. By means of the low temperature process of the invention, involving anneal below the sintering range of the iron, the large initial surface area of the iron is preserved. The resulting catalyst containing cementite thus has an undiminished surface area and is highly suited for use as a heterogeneous catalyst.

The following examples are intended to illustrate the invention:

*Example 1*

This example illustrates the production of the heterogeneous catalyst containing cementite which is particularly suitable for use in the so-called Fischer-Tropsch process involving the catalytic hydrogenation of carbon monoxide. In order to provide a metallic iron structure having a large surface area which, when converted at least partially to cementite, has good catalytic properties, the following procedure was employed.

A fused iron oxide consisting predominantly of high-purity magnetite and containing small quantities of catalytic promoters was employed as a starting material. Before reduction and carburization the fused mass had the following composition:

| Component: | Percent by weight |
|---|---|
| Fe₃O₄ | 93.1 |
| K₂O | .57 |
| SiO₂ | 0.71 |
| Cr₂O₃ | 0.65 |
| MgO | 4.61 |

The above mass was reduced in a stream of hydrogen at 450° C. for about 82 hours which resulted in reduction of substantially all of the Fe₃O₄ to metallic iron. The resulting mass was extremely porous and by virtue of its porosity possessed a very large surface area. This mass was carburized at 240° C. in a stream of carbon monoxide for one hour and the carburization was then discontinued. At this time, the atom ratio of carbon to iron was 0.2680 as determined by the weight gain of the mass. This partially carburized mass was then heated in an inert atmosphere to 578° C. for about 12 minutes and then cooled. The resulting product was identified as about 85% cementite and about 15% metallic iron uncontaminated by free carbon.

Example 2

A fused mixture of magnetite and promoters having the same composition as the fused mass described in Example 1 was reduced with flowing hydrogen at 450° C. for 70.5 hours, thus producing a porous mass consisting predominantly of free iron. This mass was carburized in a stream of flowing carbon monoxide at 240° C. for 4 hours. After this time, the atomic ratio of carbon to iron was 0.295 as measured by the weight gain of the mass. This partially carburized mass was heated to 472° and held at this temperature for 1½ hours. The reaction $$Fe_2C + Fe \rightarrow Fe_3C$$

was found to begin at about 270° C. as noted by means of a magnetic balance. The Fe₂C was quantitatively converted to cementite and the resulting mass was predominantly cementite, uncontaminated by free carbon, and containing only a small amount of free iron due to the slight excess of free iron in the partially carburized sample.

Example 3

A fused magnetite mass having the same composition as the fused mass described in Example 1 was reduced in a stream of hydrogen at 450° C. for about 176 hours which resulted in a porous mass consisting predominantly of free iron. Following reduction, the porous mass was carburized in a stream of carbon monoxide at 240° C. for 5 hours. At this time, the carbon to iron atomic ratio was 0.3493 (slightly above an atom ratio of 1:3) as measured by the gain in weight of the mass. A portion of this preparation was heated to 555° C. in an inert atmosphere and held at this temperature for about one hour. A reaction was noted, by means of a magnetic balance, to begin at about 320° C. and at the end of an hour's heating at 550° C., the sample contained only cementite and a small amount of free carbon. The presence of this small amount of free carbon was due to the fact that the iron mass originally had been carburized to an atom ratio of carbon to iron greater than 1:3 and to the fact that a comparatively high temperature was used during the anneal. During the anneal, all of the free iron reacted with Fe₂C to form Fe₃C, and then the small amount of Fe₂C remaining decomposed according to the equation $$3Fe_2C \rightarrow 2Fe_3C + C$$

By carrying out the anneal at a temperature of about 470° C. for about two hours, decomposition of the Fe₂C to free carbon and cementite is prevented and the final product contains only Fe₃C with a small amount of Fe₂C, uncontaminated by free carbon.

Example 4

Another portion taken from the same carburized preparation described in Example 3, before annealing, was heated to about 790° C. in an inert atmosphere and then cooled. After this treatment, the sample contained cementite, some free carbon, and about 2% free iron, showing that too high a temperature during annealing causes decomposition of cementite.

The cementite-containing materials prepared particularly as in Examples 1 and 2 are active catalysts in the process involving the catalytic hydrogenation of carbon monoxide. The use of cementite-containing catalysts in this process is described in the co-pending application of Anderson et al., Serial No. 111,755, filed Aug. 22, 1949, entitled "Catalytic Hydrogenation of Carbon Oxides Employing Iron Carbide Catalysts." The present invention provides a convenient and simple method for preparing catalytic masses containing cementite which are free from harmful deposits of elemental carbon and which possess large surface areas, which properties make them eminently suited for use in this process.

The cementite, or cementite-containing materials prepared according to the process of the invention, are, however, not restricted to use as catalytic materials but may also be used for other purposes, for example, as an alloying component, as a permanent magnet material in electrical and magnetic-measuring instruments and devices, in powder metallurgy and for any other purpose where cementite-containing materials are needed in good purity and particularly when needed uncontaminated by free carbon.

It is to be understood that the above description and examples are merely for the purpose of illustrating the invention and the invention is not to be limited thereby nor in any way except by the scope of the appended claims.

We claim:

1. A method for the preparation of cementite comprising the steps of carburizing iron at a temperature of from 100° C. to 350° C., discontinuing said carburizing treatment before the atom ratio of carbon to iron reaches 1:2, and then annealing said carburized iron at a temperature of from 250° C. to 700° C. to convert at least a portion of the iron carbides present in said carburized iron to cementite.

2. A method for the preparation of cementite comprising the steps of carburizing iron at a temperature of from 100° C. to 350° C., discontinuing said carburizing treatment before the atom ratio of carbon to iron exceeds 1:3, and then annealing said carburized iron at a temperature of from 250° C. to 700° C. to convert at least a portion of the iron carbides present in said carburized iron to cementite.

3. A method for the preparation of cementite comprising the steps of carburizing iron by subjecting said iron to the action of a carboniferous gas at a temperature of from 100° C. to 350° C., discontinuing said carburization treatment before the atom ratio of carbon to iron reaches 1:2, and then annealing said carburized iron at a temperature of from 250° C. to 700° C. to convert at least a portion of the iron carbides present in said carburized iron to cementite.

4. A method for the preparation of cementite comprising the steps of carburizing iron by subjecting said iron to the action of a carboniferous gas at a temperature of from 100° C. to 350° C., discontinuing said carburizing treatment before the atom ratio of carbon to iron exceeds 1:3, and then annealing said carburized iron at a temperature of from 250° C. to 700° C., to convert at least a portion of the iron carbides present in said carburized iron to cementite.

5. A method for the preparation of cementite comprising the steps of carburizing iron by subjecting said iron to the action of a carboniferous gas at a temperature of from 150° C. to 275° C., discontinuing said carburizing treatment before the atom ratio of carbon to iron exceeds 1:3, and then annealing said carburized iron at a temperature of from 400° C. to 550° C., to convert at least a portion of the iron carbides present in said carburized iron to cementite.

6. A method for the preparation of cementite comprising the steps of carburizing iron by subjecting said iron to the action of a carboniferous gas selected from the group consisting of carbon monoxide and hydrocarbon gases at a temperature of from 150° C. to 275° C., discontinuing said carburizing treatment before the atom ratio of carbon to iron exceeds 1:3, and then annealing said carburized iron at a temperature of from 400° C. to 550° C., to convert at least a portion of the iron carbides present in the carburized iron to cementite.

7. A method for the preparation of a catalytic material containing cementite which is substantially free from elemental carbon and which possesses a large surface area comprising the steps of carburizing iron having a large surface area by subjecting said iron to the action of a carboniferous gas at a temperature of from 100° C. to 350° C., discontinuing said carburizing treatment before the atom ratio of carbon to iron reaches 1:2, and then annealing said carburized iron at a temperature of from 250° C. to 700° C., said temperature being below that at which sintering of said iron occurs, to convert at least a portion of the carbides present in said carburized iron to cementite, while avoiding a decrease in the initial surface area of said iron.

8. A method for the preparation of a catalytic material containing cementite which is substantially free from elemental carbon and which possesses a large surface area comprising the steps of carburizing iron having a large surface area by subjecting said iron to the action of a carboniferous gas at a temperature of from 100° C. to 350° C., discontinuing said carburizing treatment before the atom ratio of carbon to iron exceeds 1:3, annealing said carburized iron at a temperature of from 250° C. to 700° C., said temperature being below that at which sintering of said iron occurs, to convert at least a portion of the carbides present in said carburized iron to cementite, while avoiding a decrease in the initial surface area of said iron.

9. A method for the preparation of a catalytic material containing cementite which is substantially free from elemental carbon and which possesses a large surface area comprising the steps of carburizing an iron mass which has been obtained by the reduction of an iron oxide at a temperature below the sintering range of said mass, by subjecting said mass to the action of a carboniferous gas at a temperature of from 100° C. to 350° C., discontinuing said carburizing treatment before the atom ratio of carbon to iron exceeds 1:3, and then annealing said carburized mass at a temperature of from 250° C. to 700° C., but below the temperature at which sintering of said mass occurs, to convert at least a portion of the carbides present in said carburized iron mass to cementite while avoiding a decrease in the initial surface area of said iron.

10. A method for the preparation of a catalytic material containing cementite which is substantially free from elemental carbon and which possesses a large surface area comprising the steps of carburizing an iron mass which has been prepared by reduction of a fused iron oxide at a temperature below that at which sintering of said mass occurs by subjecting said mass to the action of a carboniferous gas selected from the group consisting of carbon monoxide and hydrocarbon gases at a temperature of from 150° C. to 275° C., discontinuing said carburizing treatment before the atom ratio of carbon to iron exceeds 1:3, and then annealing said mass at a temperature of from 400° C. to 550° C., to convert at least a portion of the carbides present in said carburized iron to cementite while avoiding a decrease in the surface area of said iron.

11. A method for the preparation of a catalytic material containing cementite which is substantially free from elemental carbon and which possesses a large surface area comprising the steps of carburizing an iron mass which has been obtained by reduction of an iron oxide at a temperature below that at which sintering of said mass occurs, by subjecting said mass to the action of a carboniferous gas selected from the group consisting of carbon monoxide and hydrocarbon gases at a temperature of from 150° C. to 275° C., discontinuing said carburizing treatment when the atom ratio of carbon to iron reaches 1:3, and then annealing said mass at a temperature of from 400° C. to 550° C., to convert all of the carbides present in said carburized iron to cementite while avoiding a decrease in the initial surface area of said iron mass.

ERNST M. COHN.
LAWRENCE J. E. HOFER.

No references cited.